(12) United States Patent
Ouren et al.

(10) Patent No.: US 8,090,911 B2
(45) Date of Patent: Jan. 3, 2012

(54) SELECTING A TARGET NUMBER OF PAGES FOR ALLOCATION TO A PARTITION

(75) Inventors: Wade B. Ouren, Rochester, MN (US); Edward C. Prosser, Rochester, MN (US); Kenneth C. Vossen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 12/424,772

(22) Filed: Apr. 16, 2009

(65) Prior Publication Data

US 2010/0268907 A1 Oct. 21, 2010

(51) Int. Cl.
*G06F 12/04* (2006.01)

(52) U.S. Cl. .......... 711/129; 711/153; 711/170

(58) Field of Classification Search .......... 711/129, 711/153, 170
See application file for complete search history.

(56) References Cited

U.S. PATENT DOCUMENTS

| | | | |
|---|---|---|---|
| 5,649,142 A * | 7/1997 | Lavelle et al. ........ 711/209 |
| 5,909,540 A | 6/1999 | Carter et al. |
| RE36,462 E | 12/1999 | Chang et al. |
| 6,976,137 B2 | 12/2005 | Ouren et al. |
| 7,506,095 B2 | 3/2009 | Otte et al. |
| 7,680,754 B2 | 3/2010 | Hillier |
| 7,698,531 B2 | 4/2010 | Flemming et al. |
| 7,702,843 B1 | 4/2010 | Chen et al. |
| 7,849,347 B2 | 12/2010 | Armstrong et al. |
| 2002/0010844 A1 | 1/2002 | Noel et al. |
| 2002/0138704 A1 | 9/2002 | Hiser et al. |
| 2003/0084372 A1 | 5/2003 | Mock et al. |
| 2004/0193861 A1 | 9/2004 | Michaelis |
| 2005/0278719 A1 | 12/2005 | Togawa |
| 2006/0075207 A1 | 4/2006 | Togawa et al. |
| 2006/0236059 A1 | 10/2006 | Fleming et al. |
| 2007/0061441 A1 | 3/2007 | Landis et al. |
| 2007/0299990 A1 | 12/2007 | Ben-Yehuda et al. |
| 2008/0040565 A1 | 2/2008 | Rozas et al. |
| 2008/0082696 A1 | 4/2008 | Bestler |
| 2008/0256321 A1 | 10/2008 | Armstrong et al. |
| 2008/0256327 A1 | 10/2008 | Jacobs et al. |
| 2008/0256530 A1 | 10/2008 | Armstrong et al. |
| 2009/0100237 A1 | 4/2009 | Orikasa et al. |
| 2009/0307436 A1 | 12/2009 | Larson et al. |
| 2009/0307438 A1 | 12/2009 | Logan et al. |
| 2009/0307440 A1 | 12/2009 | Jacobs et al. |
| 2009/0307441 A1 | 12/2009 | Hepkin et al. |
| 2009/0307445 A1 | 12/2009 | Jacobs et al. |

(Continued)

*Primary Examiner* — Son Dinh
*Assistant Examiner* — Nam Nguyen
(74) *Attorney, Agent, or Firm* — Owen Gamon

(57) ABSTRACT

In an embodiment, a target number of discretionary pages for a first partition is calculated as a function of a number of physical page table faults, a number of sampled page faults, a number of shared physical page pool faults, a number of re-page-ins, and a ratio of pages. If the target number of discretionary pages for the first partition is less than a number of the discretionary pages that are allocated to the first partition, a result page is found that is allocated to the first partition and the result page is deallocated from the first partition. If the target number of discretionary pages for the first partition is greater than the number of the discretionary pages that are allocated to the first partition, a free page is allocated to the first partition.

20 Claims, 12 Drawing Sheets

U.S. PATENT DOCUMENTS

| | | |
|---|---|---|
| 2009/0307447 A1 | 12/2009 | Jacobs et al. |
| 2009/0307688 A1 | 12/2009 | Pafumi et al. |
| 2009/0307690 A1 | 12/2009 | Logan et al. |
| 2009/0307713 A1 | 12/2009 | Anderson et al. |
| 2010/0079302 A1 | 4/2010 | Eide et al. |
| 2010/0083252 A1 | 4/2010 | Eide et al. |

* cited by examiner

VIRTUAL PAGE TABLE (160)

CACHE PAGE TABLE (360)

| VIRTUAL ADDRESSES | VALID | LOGICAL ADDRESSES |
|---|---|---|
| 0001 | YES | 100A |
| 0002 | YES | 23CD |
| 0003 | YES | 2BF3 |
| 0004 | NO | |
| 0005 | YES | E46A |
| 0006 | YES | 1256 |

PHYSICAL PAGE TABLE (362)

| VIRTUAL ADDRESSES | VALID | PHYSICAL ADDRESSES |
|---|---|---|
| 0001 | NO | |
| 0002 | YES | C20A |
| 0003 | NO | |
| 0004 | YES | A56E |

FIG. 3A

LOGICAL MEMORY MAP (161)

| LOGICAL ADDRESSES | PHYSICAL ADDRESSES |
|---|---|
| 100A | 8698 |
| 23CD | C20A |
| 2BF3 | |
| E46A | 2243 |
| 1256 | 2244 |

FIG. 3B

SELECTING A TARGET NUMBER OF PAGES FOR ALLOCATION TO A PARTITION

FIELD

An embodiment of the invention generally relates to selecting a target number of pages for allocation to a partition.

BACKGROUND

Computer systems typically include a combination of hardware (e.g., semiconductors, circuit boards, etc.) and computer programs. As advances in semiconductor processing and computer architecture push the performance of the computer hardware higher, more sophisticated computer programs have evolved to take advantage of the higher performance of the hardware, resulting in computer systems today that are much more powerful than just a few years ago. One advance in computer technology is the development of parallel processing, i.e., the performance of multiple tasks in parallel.

A number of computer technologies have been developed to facilitate increased parallel processing. From a hardware standpoint, computers increasingly rely on multiple microprocessors to provide increased workload capacity. From a program standpoint, multithreaded operating systems and kernels have been developed, which permit computer programs to execute in multiple threads, so that multiple tasks can essentially be performed concurrently. In addition, some computers implement the concept of logical partitioning, where a single physical computer operates essentially like multiple and independent virtual computers, referred to as logical partitions. Each logical partition executes a separate operating system, and from the perspective of users and of the applications executing in the logical partition, operates as a fully independent computer. The various resources in the physical computer are allocated among the various logical partitions via a partition manager, or hypervisor. The resources may include processors, adapters, input/output devices, network bandwidth, and memory.

The physical memory of a computer system is typically allocated among various logical partitions using a technique known as virtual memory. Virtual memory gives each logical partition the impression or view that it is accessing contiguous memory within a range of contiguous virtual addresses, also known as an address space, but in fact the memory pieces that the partition accesses are physically fragmented and non-contiguous, meaning that they are scattered at various locations at non-contiguous physical addresses in the physical memory and may overflow to secondary storage, such as disk drives, which are typically larger and slower than memory. Virtual memory can make programming of applications within the partition easier and can make the use of physical memory more efficient.

SUMMARY

A method, apparatus, computer system, and storage medium are provided. In an embodiment, a target number of discretionary pages for a first partition is calculated as a function of load weight components, such as a number of physical page table faults, a number of sampled page faults, a number of shared physical page pool faults, a number of re-page-ins, and a ratio of logical addresses to allocated physical pages. If the target number of discretionary pages for the first partition is less than a number of the discretionary pages that are allocated to the first partition, a result page is found that is allocated to the first partition and the result page is deallocated from the first partition. If the target number of discretionary pages for the first partition is greater than the number of the discretionary pages that are allocated to the first partition, a free page is allocated to the first partition. If the target number of discretionary pages for the first partition is equal to the number of the discretionary pages that are allocated to the first partition, a free page is not allocated to the first partition.

BRIEF DESCRIPTION OF THE DRAWINGS

Various embodiments of the present invention are hereinafter described in conjunction with the appended drawings:

FIG. 3A depicts a block diagram of an example virtual page table, according to an embodiment of the invention.

FIG. 3B depicts a block diagram of an example logical memory map, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
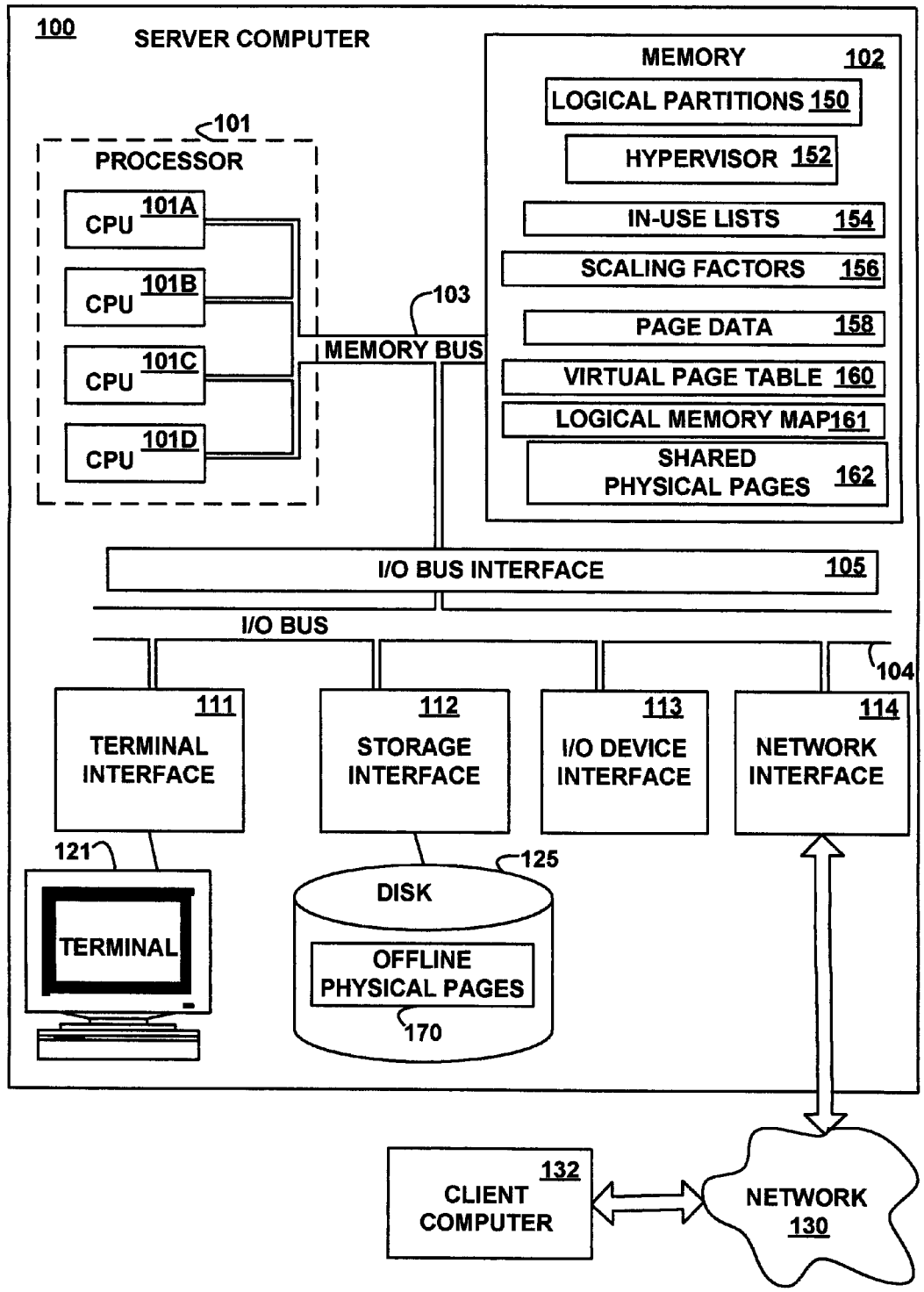
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "client" and "server" are used herein for convenience only, and in various embodiments a computer system that operates as a client in one environment may operate as a server in another environment, and vice versa.

The major components of the computer system 100 include one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes the logical partitions 150, a hypervisor 152, in-use lists 154, scaling factors 156, page data 158, virtual page tables 160, a logical memory map 161, and shared physical pages 162. Although the logical partitions 150, the hypervisor 152, the in-use lists 154, the scaling factors 156, the page data 158, the virtual page tables 160, the logical memory map 161, and the shared physical pages 162 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the logical partitions 150, the hypervisor 152, the in-use lists 154, the scaling factors 156, the page data 158, the virtual page tables 160, the logical memory map 161, and the shared physical pages 162 are illustrated as being contained within the main memory 102, these elements are not necessarily all completely contained in the same storage device at the same time. Further, although the logical partitions 150, the hypervisor 152, the in-use lists 154, the scaling factors 156, the page data 158, the virtual page tables 160, the logical memory map 161, and the shared physical pages 162 are illustrated as being separate entities, in other embodiments some of them, portions of some of them, or all of them may be packaged together.

The logical partitions 150 are further described below with reference to FIG. 2. The virtual page tables 160 are further described below with reference to FIG. 3A. The logical memory map 161 is further described below with reference to FIG. 3B. The shared physical pages 162 are further described below with reference to FIG. 4. The in-use lists 154 are further described below with reference to FIG. 5. The page data 158 is further described below with reference to FIG. 6. The scaling factors 156 are further described below with reference to FIG. 7.

The hypervisor 152 activates the logical partitions 150 and allocates resources to the logical partitions 150. In an embodiment, the hypervisor 152 includes instructions that execute on the processor 101 or statements that are interpreted by instructions that execute on the processor 101, to carry out the functions as further described below with reference to FIGS. 8, 9, 10, 11, and 12. In another embodiment, the hypervisor 152 is implemented in hardware via logical gates and other hardware devices in lieu of, or in addition to, a processor-based system.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., a PCI (Peripheral Component Interconnect) bus, or any other appropriate bus technology.

The I/O interface units support communication with a variety of storage and I/O devices. For example, the terminal interface unit 111 supports the attachment of one or more user terminals 121, which may include user output devices (such as a video display device, cathode ray tube, speaker, and/or television set) and user input devices (such as a keyboard, mouse, keypad, touchpad, trackball, buttons, light pen, or other pointing device). A user interacts with the input devices of the terminal 121 to enter, input, send, or transmit data to the server computer 100 and interacts with the output devices to receive or perceive data from the server computer 100.

The storage interface unit 112 supports the attachment of one or more disks or direct access storage devices (DASD) 125 (which are typically rotating magnetic disk drive storage devices, although they could alternatively be other devices, including arrays of disk drives configured to appear as a single large storage device to a host). The disk 125 stores or encodes the offline physical pages 170. The contents of the main memory 102 are stored to and retrieved from the direct access storage devices 125, as needed, as part of a process known as paging or swapping.

In particular, the shared physical pages 162 are stored to and retrieved from the offline physical pages 170, as needed. In an embodiment, the shared physical pages 162 are a subset of the offline physical pages 170 and the processor 101 writes and reads data to and from the shared physical pages 162 in response to the execution of instructions by the processor 101. In response to certain stimuli, the processor 101 copies the contents of selected pages of the offline physical pages 170 to the shared physical pages 162 and, in response to other stimuli, copies the contents of selected of the shared physical pages 162 to the offline physical pages 170, via the paging or swapping process.

The I/O device interface 113 provides an interface to any of various other input/output devices or devices of other types, such as printers or fax machines. The network adapter 114 provides one or more communications paths from the computer system 100 to other digital devices and computer systems 132; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user mainframe computer system, a single-user system, or a server or similar device that has little or no direct user interface, but receives requests from other computer systems, such the client computer 132. In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or programs to/from the computer systems 100 and 132. In various embodiments, the network 130 may represent a storage device, a combination of storage devices, an electronic devices or devices (e.g., routers, computer systems, and transmission lines) either connected directly or indirectly to the computer system 100. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3 specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The client computer system 132 may include some or all of the hardware components previously described above as being included in the server computer system 100.

It should be understood that FIG. 1 is intended to depict the representative major components of the server computer system 100, the network 130, and the client computer system 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer program applications, routines, components, programs, objects, modules, and data structures, and are referred to hereinafter as "computer programs," or simply "programs." The computer programs comprise one or more instructions or statements that are resident at various times in various memory and storage devices in the server computer system 100, and that, when read and executed by one or more processors 101 in the computer system 100, cause the computer system 100 to perform the steps necessary to execute or perform the various aspects of embodiments of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the server computer system 100 via a variety of tangible signal-bearing media that may be operatively or communicatively connected (directly or indirectly) to the processor or processors, such as the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive; or (2) alterable information stored on a rewriteable storage medium, e.g., a hard disk drive (e.g., the disk 125), the main memory 102, CD-RW, or diskette.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of the invention.

Figure 2:
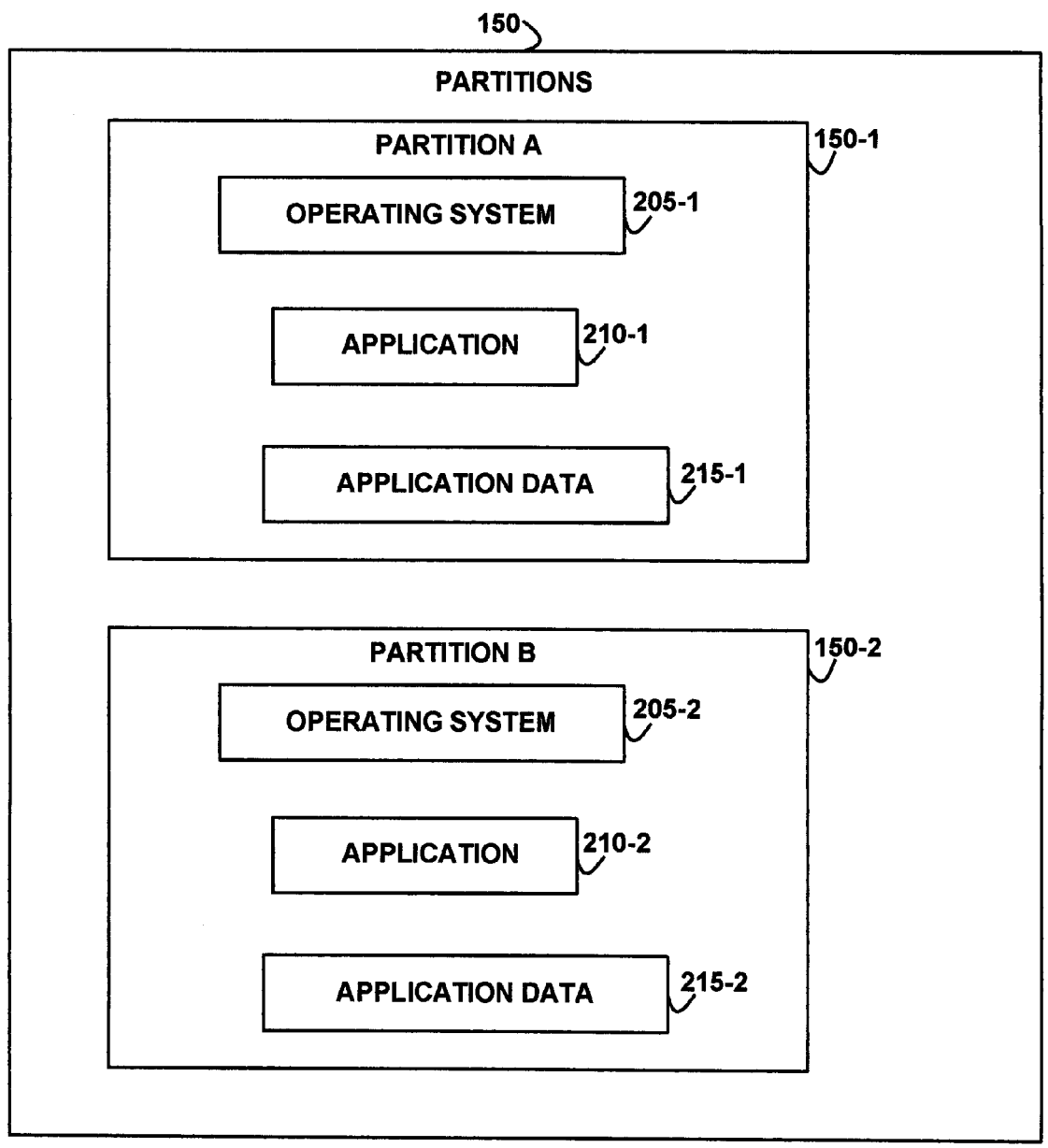
FIG. 2 depicts a block diagram of example partitions, according to an embodiment of the invention.

FIG. 2 depicts a block diagram of example logical partitions 150, according to an embodiment of the invention. The example logical partitions 150 generically represent the partitions 150-1 and 150-2. The partition 150-1 includes an operating system 205-1, an application 210-1, and application data 215-1. The partition 150-2 includes an operating system 205-2, an application 210-2, and application data 215-2.

The operating systems 205-1 and 205-2 include instructions that execute on the processor 101 or statements that are interpreted by instructions that execute on the processor 101. The operating systems 205-1 and 205-2 control the primary operations of their respective partitions 150-1 and 150-2 in much the same manner as the operating system of a non-logically partitioned computer. The operating systems 205-1 and 205-2 perform basic tasks for their respective partitions 150-1 and 150-2, such as recognizing input from the keyboard of the terminal 121 and sending output to the display screen of the terminal 121. The operating systems 205-1 and 205-2 may further open and close files or data objects, such as the respective application data 215-1 and 215-2, read and write data to and from storage devices 125, and control peripheral devices, such as disk drives and printers.

The operating systems 205-1 and 205-2 may further support multi-user, multiple-processing, multi-tasking, and multi-threading operations. In multi-user operations, the operating systems 205-1 and 205-2 may allow two or more users at different terminals 121 to execute the applications 210-1 and 210-2 at the same time (concurrently), in order to access (read and/or write) the respective application data 215-1 and 215-2. In multiprocessing operations, the operating systems 205-1 and 205-2 may support the executing of the respective applications 210-1 and 210-2 on more than one processor 101. In multi-tasking operations, the operating systems 205-1 and 205-2 may support executing multiple applications concurrently. In multithreading operations, the operating systems 205-1 and 205-2 may support allowing different parts or different instances of a single respective application to run concurrently. In various embodiments, the operating systems 205-1 and 205-2 of different respective partitions 150-1 and 150-2 may be the same operating system or the same type of operating system, or some or all of them may be different.

In various embodiments, the applications 210-1 and 210-2 may be user applications, third party applications, or OEM (Original Equipment Manufacture) applications. In various embodiments, the applications 210-1 and 210-2 include instructions that execute on the processor 101 or statements that are interpreted by instructions that execute on the processor 101.

FIG. 3A depicts a block diagram of an example virtual page table 160, according to an embodiment of the invention. The virtual page table 160 includes a cache page table 360 and a physical page table 362. A separate virtual page table with different contents exists for each of the logical partitions 150.

The cache page table 360 maps virtual addresses of the shared physical pages 162 to logical addresses of the shared physical pages 162. The operating systems 205-1 and 205-2 are aware of and maintain (write to and read from) their respective cache page table, in order to access (read data from and write data to) the shared physical pages 162, but are not aware of and do not read their respective physical page table 362. In order to access the shared physical pages 162, the operating systems 205-1 and 205-2 create a translation of a virtual address to a logical address in their respective cache page table. In response to a partition accessing or referencing a virtual address during execution of its programs (e.g., the operating system and the applications), the hypervisor creates a virtual address to physical address translation (mapping) in the physical page table 362 and a logical address to physical address translation (mapping) in the logical memory map 161. Each entry in the cache page table 360 includes a virtual address, the corresponding logical address, and a valid field that indicates whether or not the translation of the virtual address to the corresponding logical address is valid.

The physical page table 362 maps virtual addresses of the shared physical pages 162 to physical addresses of the shared physical pages 162. The processor 101 is aware of and reads the physical page table 362, in order to access (read data from and write data to ) the shared physical pages 162, but is not aware of and does not read the cache page table 360. The processor 101 accesses the memory 102 using the physical addresses, in order to process instructions that the processor executes. Each entry in the physical page table 362 contains the virtual address of the physical page, the corresponding physical address of the physical page in the memory 102, and a valid field that indicates whether or not the translation of the virtual address to the physical address is valid. If the translation of the virtual address to the physical address is valid, then the corresponding physical page exists in the memory 102. If the translation of the virtual address to the physical address is not valid, then a page fault on the physical page table 362 occurs, in response to the processor 101 attempting to access the page, and the hypervisor determines whether the page exists in the shared physical pages 162 in the memory 102 and can be accessed or whether the page does not exist in the shared physical pages 162 in the memory 102 and must be swapped, read, or paged in from the offline physical pages 170 to the shared physical pages 162, in order to be accessed.

The virtual addresses in the physical page table 362 are a subset of the virtual addresses in the cache page table 360. The virtual addresses in the cache page table 360 are a subset of the virtual address space of the partition 150-1 or 150-2. Because the cache page table 360 and the physical page table 362 are limited in size, the shared physical pages 162 in the memory 102 may or may not have valid virtual address to logical address translations in the cache page table 360, and may or may not have valid virtual to physical address translations in the physical page table 362.

FIG. 3B depicts a block diagram of an example logical memory map 161, according to an embodiment of the invention. A separate logical memory map exists for each of the logical partitions 150.

The logical memory map 161 describes a partition's logical memory and includes an entry for each page in the partition's logical memory space, which indicates whether or not a logical address maps to a physical address and, if the mapping exists, the physical address to which the logical address maps or is associated. When no logical to physical address mapping exists for a logical address in the logical memory map 161, a shared physical page pool page fault occurs as a result of the partition accessing or referencing the logical address (i.e., as a result of the programs in the partition accessing or referencing the logical address as they execute on the processor).

In response to a shared physical page pool page fault, the hypervisor finds an available (free and unallocated) shared physical page in the shared physical pages 162, allocates the available shared page to the partition, creates the logical-to-physical mapping, stores the logical-to-physical mapping to the logical memory map 161, and reads the physical page contents from the offline physical pages 170 in the disk 125 to the shared physical pages 161. The partition (the executing operating system or applications within the partition) then accesses (reads and/or writes) data from and/or to the shared physical page.

If a logical to physical address mapping does exist for a logical address in the logical memory map 161, then no shared physical page pool page fault occurs, and the partition accesses (reads and/or writes) data from and/or to the shared physical page that is pointed to by the physical address.

Figure 4:
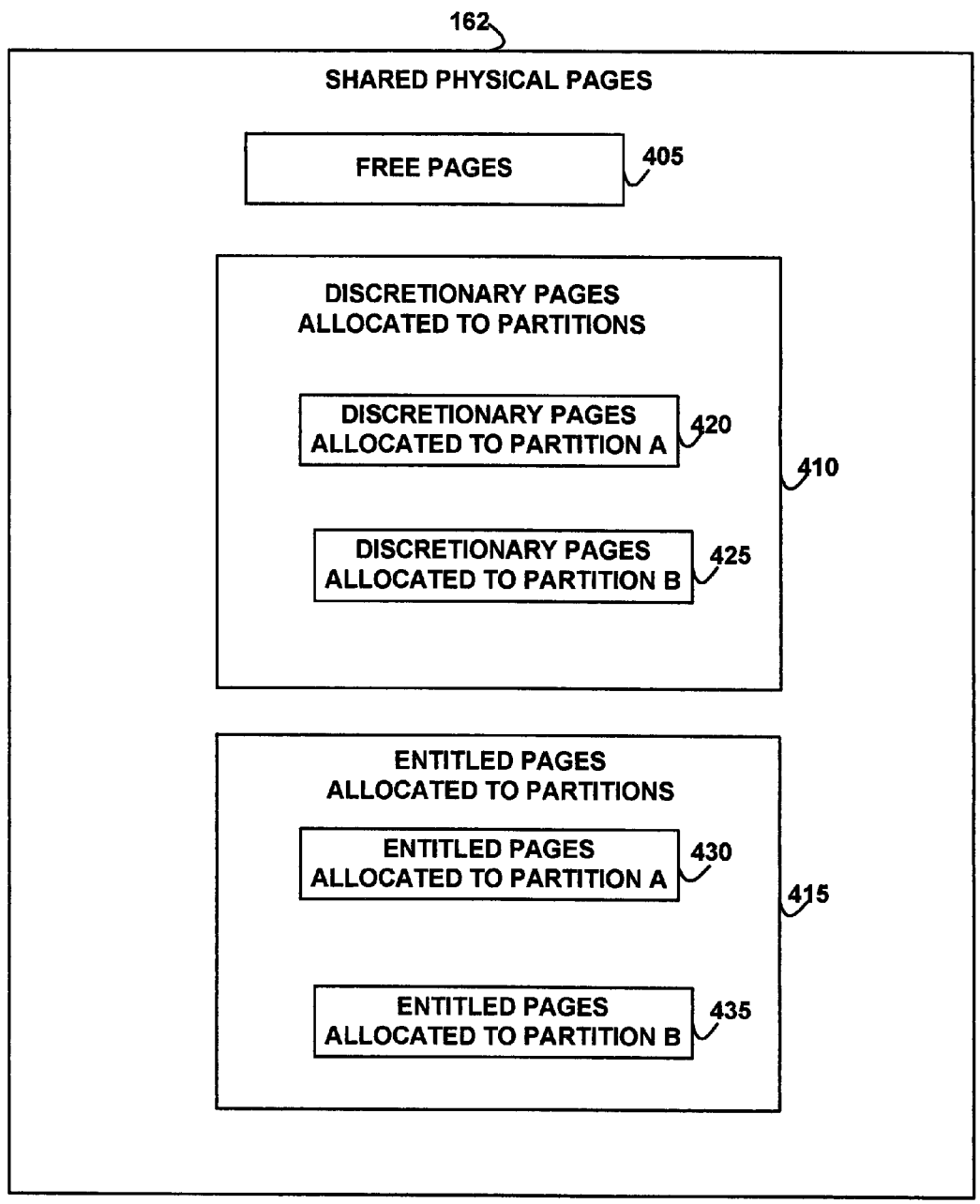
FIG. 4 depicts a block diagram of example shared physical pages, according to an embodiment of the invention.

FIG. 4 depicts a block diagram of example shared physical pages 162, according to an embodiment of the invention. A page is a unit of access of transfer of the memory 102 and represents an amount of a portion of the memory 102.

The shared physical pages 162 include free pages 405, discretionary pages 410 that are allocated to the logical partitions 150, and entitled pages 415 that are allocated to the logical partitions 150. The free pages 405 are not currently allocated to any partition and are available for allocation to a partition. The discretionary pages 410 are currently allocated to a partition and are available for possible deallocation from the partition. For example, the discretionary pages 420 are allocated to the partition A and are available for deallocation, and the discretionary pages 425 are allocated to the partition B and are available for deallocation. The entitled pages 415 are currently allocated to a partition and are unavailable for deallocation from the partition. For example, the entitled pages 430 are allocated to the partition A and are unavailable for deallocation, and the entitled pages 435 are allocated to the partition B and are unavailable for deallocation.

A page that is allocated to a partition is capable of being read from or written to by that partition while a page that is not allocated to the partition (either because it is free or because it is allocated to a different partition) is not capable of being read from or written to by the partition to which it is not allocated. For example, the discretionary pages 420 and the entitled pages 430 may be read from and written to by the partition A (but not the partition B), and the discretionary pages 425 and the entitled pages 435 may be read from and written to by the partition B, but not the partition A.

The status of the discretionary pages 410 is tracked by the in-use lists 154 while the free pages 405 and the entitled pages 415 are not tracked by the in-use lists 154.

Examples of data and programs stored in the entitled pages 415 may include interrupt handlers, data buffers used by peripheral devices or I/O channels, or any timing dependent or performance-sensitive programs that cannot tolerate the varying response time caused by deallocation and reallocation from and to the various logical partitions 150.

The virtual memory of the computer system 100 is divided in an address space with units of pages, where a page is a block of contiguous virtual memory addresses, but the physical addresses at which the physical pages are stored that correspond to the virtual memory addresses are not contiguous. Thus, none of the pages 420, 425, 430, or 435 are stored at contiguous physical addresses.

Figure 5:
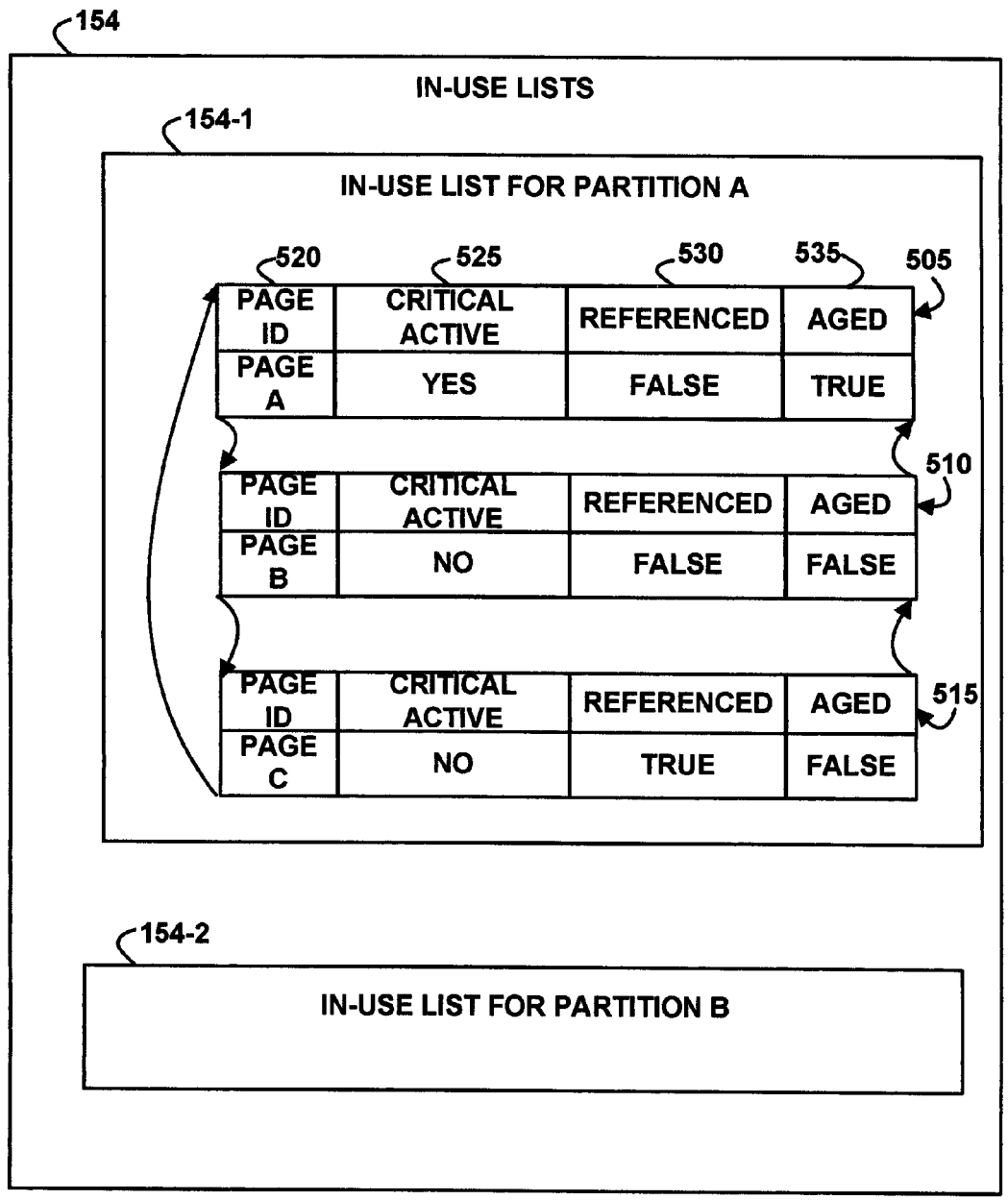
FIG. 5 depicts a block diagram of example in-use lists, according to an embodiment of the invention.

FIG. 5 depicts a block diagram of example in-use lists 154, according to an embodiment of the invention. An in-use list is a circular doubly-linked list data structure that tracks the discretionary pages 410 that are currently in use (are not free), are assigned, or are allocated to a partition, but are not pinned for entitlement to the partition (are not part of the entitled pages 415). The in-use lists 154 include an in-use list for each partition, such as the example in-use list 154-1 for partition A and the in-use list 154-2 for partition B.

The in-use list 154-1 for the partition A tracks the discretionary pages that are allocated to the partition A. The in-use list 154-1 includes example records 505, 510, and 515, each of which includes a page identifier field 520, a critical active field 525, a referenced field 530, and an aged field 535. The in-use list 154-2 for the partition B tracks the discretionary pages that are allocated to the partition B and includes records that contain fields analogous to the page identifier field 520, the critical active field 525, the referenced field 530, and the aged field 535.

The record 505 represents the head of the in-use list 154-1, and the record 515 represents the tail of the in-use list 154-2. The page identifier field 520 identifies, points at, or contains the physical address of the page in the shared physical pages 162 that is associated with or represented by the record that contains the value in the page identifier field 520. The critical active field 525 indicates whether the page associated with the record has been marked or identified as critical by a partition. The referenced field 530 indicates whether the page associated with the record has been recently referenced or accessed by the partition. The aged field 535 indicates whether the page associated with the record has been marked as aged by the aging algorithm of FIGS. 10 and 11.

Records that represent pages are added to the in-use list 154-1 at the tail (e.g., at the position occupied by the record 515) of the in-use list 154-1. In response to a record being added to the in-use list 154-1, the hypervisor 152 sets the value in the referenced field 530 in the record associated with the page identified in the page identifier field 520 to represent true, indicating that the page has been recently accessed, and the hypervisor 152 sets the value in the aged field 535 in the record associated with the page to represent false, indicating that the page 520 has not been aged by the aging algorithm of FIGS. 10 and 11. In response to a partition referencing, accessing, or reading or writing data to the page 520, the hypervisor 152 sets the value in the referenced field 530 in the record associated with the page to represent true, and the hypervisor 152 sets the value in the aged field 535 in the record associated with the page to represent false.

Figure 6:
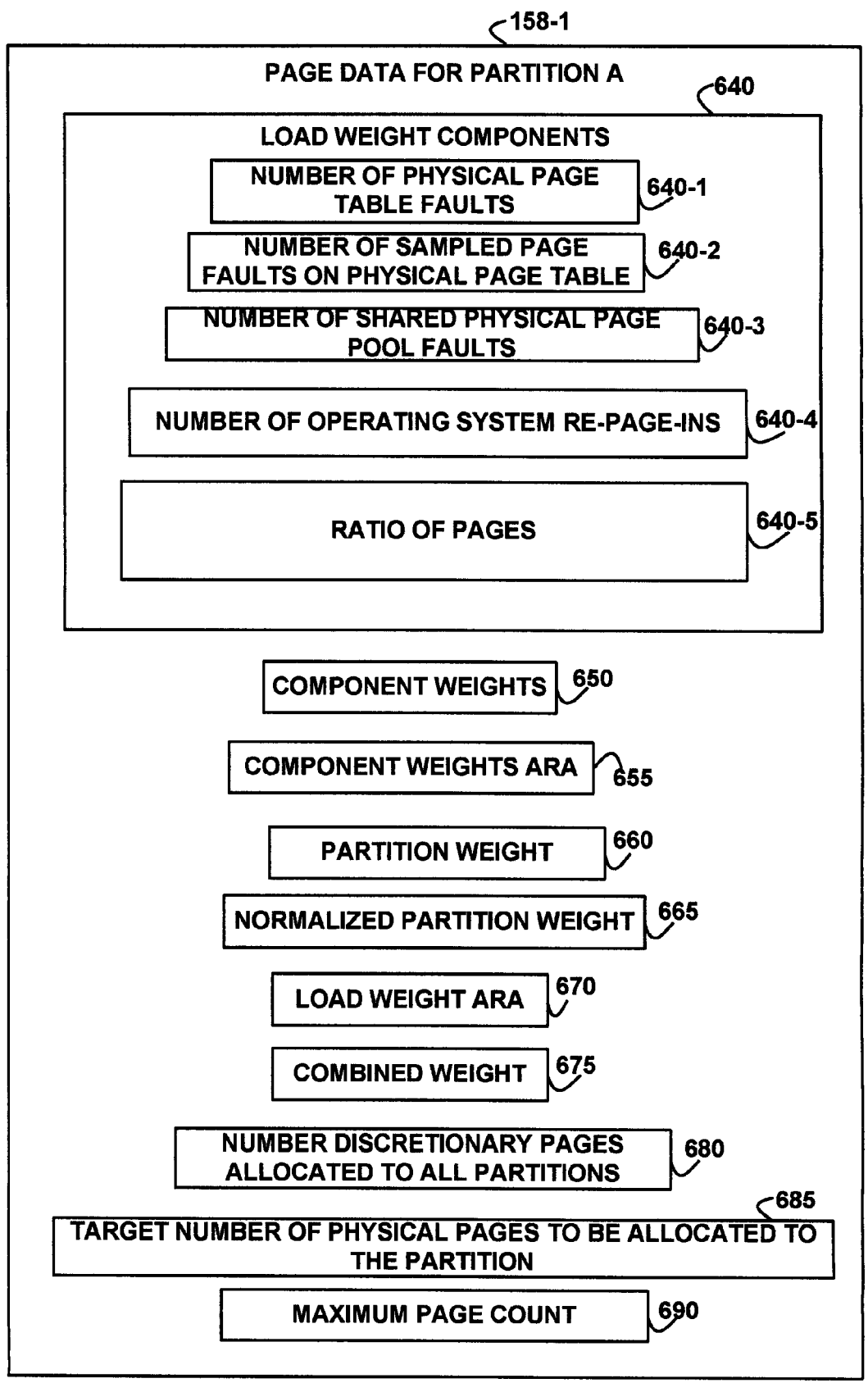
FIG. 6 depicts a block diagram of an example page data, according to an embodiment of the invention.

FIG. 6 depicts a block diagram of an example page data 158-1, according to an embodiment of the invention. The example page data 158-1 is an example of page data 158 and is associated with and represents the activity of the partition A 150-1 with respect to the discretionary pages 420 that are allocated to the partition A. Each partition in the logical partitions 150 has its own associated page data that represents its own activity with respect to its own allocated discretionary pages.

The page data 158-1 includes load weight components 640, component weights 650, component weights accumulated running average 655, a partition weight 660, a normalized partition weight 665, a load weight accumulated running average 670, a combined weight 675, a total number 680 of discretionary pages that are allocated to all of the logical partitions 150, a target number 685 of discretionary physical pages for allocation to the partition A, and a maximum page count 690.

The load weight components 640 include a number of physical page table faults 640-1, a number of sampled page faults 640-2, a number of shared physical page pool faults 640-3, a number of re-page-ins 640-4, and a ratio of pages 640-5. The load weight components 640 generically refer to the load weight components 640-1, 640-2, 640-3, 640-4, and 640-5.

The number of physical page table faults 640-1 is the number of page faults on the physical page table 362 that the partition A has incurred during the most recent tuning cycle. That is, the number of physical page table faults 640-1 is the number of times or occurrences, during the most recent tuning cycle, that the partition A, while executing on the processor 101, attempted to access a page and encountered a virtual address to physical address translation that was not valid in the physical page table 362.

The number of sampled page faults 640-2 is the number of page faults on the physical page table 362 that occurred, during the most recent tuning cycle, in response to the partition A attempting to access pages having virtual addresses for which the hypervisor 152 had invalidated a random set of virtual address to physical address translations in the physical page table 362.

The number of shared physical page pool faults 640-3 is the number of page faults on the logical memory map 161 that occurred, during the most recent tuning cycle, in response to the partition A attempting to access pages. That is, the number of shared physical page pool faults 640-3 is the number times or occurrences that the partition A attempted to access a page and the page was not present in the shared physical pages 162 in the memory 102, as indicated by the logical address to physical address mapping not being present or not being valid in the logical memory map 161. Since the page that caused the page fault was not present in the shared physical pages 162 in the memory 102, in response, the hypervisor 152 reads the page from the offline physical pages 170 in the disk 125 and copies the page to the shared physical pages 162, from which the partition accesses (reads and/or writes the content of) the page.

The number of re-page-ins 640-4 for the partition is the number of page faults the operating system in that partition experienced or incurred for the shared physical pages 162 that are allocated to that partition. The operating systems manage their respective logical partition memory within the physical pages that the hypervisor allocates to the partitions. The operating systems have their own paging devices (e.g., the disk 125) that the operating systems use separately from the hypervisor's shared physical pages 162. If a partition uses more logical memory than the physical memory the hypervisor allocates to the partition, then such a use causes the partition to reference a logical address for which there is no current and valid physical page mapping in the logical memory map 161.

In response to this lack of a valid logical address to physical address mapping in the logical memory map 161, the partition either:

(a) incurs its own page fault within its own physical memory (which is reported via the number of re-page-ins 640-4 to the hypervisor), which allows the operating system to select which of its own pages to page (write) out to the disk 125 (a decision that the operating system may make using partition-specific data unknown to the hypervisor); or (b) the partition may incur a shared physical page pool fault, which results in the hypervisor selecting a physical page to allocate to the partition, paging (writing) out the contents (if any) to the hypervisor's shared physical pool paging device, and paging-in (reading) the requested page contents from the hypervisor's shared physical pool paging storage device.

Thus, both the operating system and the hypervisor perform paging, and the number of re-page-ins 640-4 represents the number of page faults the operating system experiences or incurs, as opposed to the number of page faults the hypervisor incurs (number of shared physical page pool faults 640-3).

The ratio of pages 640-5 is the ratio of the number of logical addresses in the partition's logical address space that are backed by physical pages to the number of physical pages that are currently allocated to the partition by the hypervisor. A logical address in the partition's logical memory space is backed by a physical page if the logical address maps (translates) to a physical address of a physical page in the shared physical pages 162 via the logical memory map 161. Thus, the ratio of pages 640-5 is a utilization rate. The hypervisor knows the numerator of this ratio (the number of logical addresses backed by physical pages) because the operating system invokes the hypervisor and requests a logical-to-physical translation to create the logical-to-physical mapping in the logical memory map 161. Any physical pages that are allocated to the partition, but that do not have a logical-to-physical mapping are either (a) wasted pages, or (b) will hopefully be used in the near future as the partition's page demand grows. If the pages are not used in the near future, the use of the ratio of pages 640-5 (in the processing of FIGS. 8 and 12) reduces the overall load weight of the partition, so that some of the underutilized pages are allocated to other partitions.

The component weights 650 are values, for each of the load weight components 640-1, 640-2, 640-3, 640-4, and 640-5, that are functions of the number of occurrences of the load weight components 640 during the most recent tuning cycle.

The component weights accumulated running average 655 is a function of the component weights 650 and an accumulation factor, which smoothes the component weights, avoiding rapid oscillations in the values of the component weights across tuning cycles.

The partition weight 660 is a weighting factor for the partition. In various embodiments, the value of partition weight 660 is set by the hypervisor 152, by a system administrator who enters the value via the user terminal 121, or via programmatic control.

The normalized partition weight 665 is a function of the partition weights 660 for all the logical partitions 150 and the number of the partitions 150.

The load weight accumulated running average 670 is a function of the load weight components 640 and the scaling factors 156.

The combined weight 675 is a function of the load weight accumulated running average 670, the normalized partition weight 665, and the scaling factors 156.

The number of discretionary pages 680 is the total number of all discretionary pages that are allocated to all the logical partitions 150. Thus, the number of discretionary pages 680 is the number of the discretionary pages 410.

The target number 685 of physical pages to be allocated to the partition is calculated by the hypervisor 152 and is used to select a partition from which to deallocate a page. The target number 685 for the partition A is a function of the combined weight 675 for the partition A, the sum of the combined weight for all partitions, and the number of discretionary pages 680 that are allocated to all partitions.

The maximum page count 690 is the maximum number of pages that are allowed to be allocated to the logical partition. The hypervisor 152 uses the maximum page count 690 as a cap or limit on the number of discretionary pages 685. In various embodiments, the value of maximum page count 690 is set by the hypervisor 152, by a system administrator who enters the value via the user terminal 121, or via programmatic control.

Figure 7:
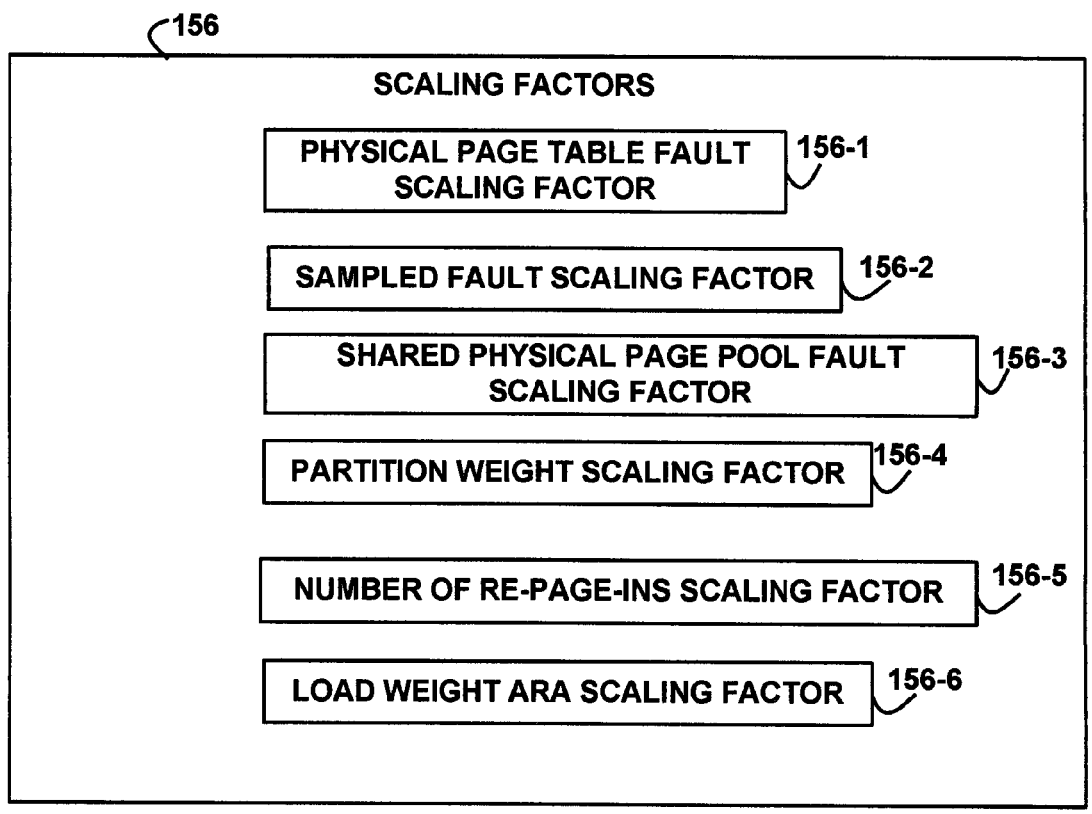
FIG. 7 depicts a block diagram of example scaling factors, according to an embodiment of the invention.

FIG. 7 depicts a block diagram of example scaling factors 156, according to an embodiment of the invention. The scaling factors 156 includes and generically refers to a physical page table fault scaling factor 156-1, a sampled fault scaling factor 156-2, a shared physical page pool fault scaling factor 156-3, a partition weight scaling factor 156-4, a number of re-page-ins scaling factor 156-5, and a load weight Accumulated Running Average (ARA) scaling factor 156-6. The scaling factors 156 are numbers that are set by the hypervisor 152, by a system administrator who enters the value via the user terminal 121, or via programmatic control. The hypervisor 152 uses the scaling factors 156 to scale or adjust the relative importance of the load weight components 640 in relation to each other.

Figure 8:
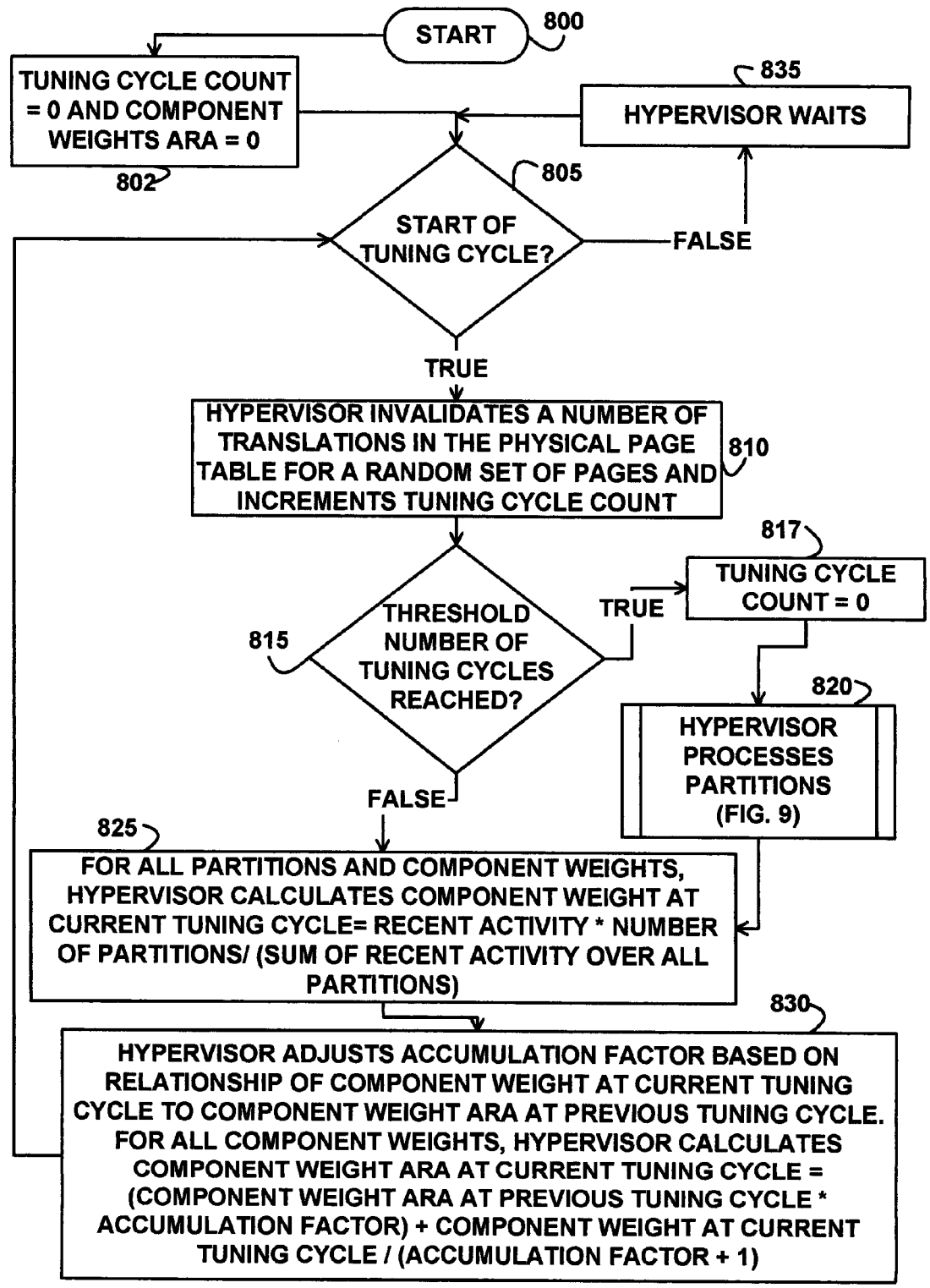
FIG. 8 depicts a flowchart of example processing for a tuning cycle, according to an embodiment of the invention.

FIG. 8 depicts a flowchart of example processing for a tuning cycle, according to an embodiment of the invention. Control begins at block 800. Control then continues to block 802 where the hypervisor 152 initializes a count of the number of tuning cycles to be zero and initializes the component weight accumulation running averages 655 for all partitions to be zero. Control then continues to block 805 where the hypervisor 152 determines whether the current time has reached or equals the time at which a tuning cycle is to start. In an embodiment, tuning cycles start periodically, at the expiration of regular time periods.

If the determination at block 805 is true, then the current time equals the start time of the next tuning cycle, so control continues to block 810 where the hypervisor 152 invalidates a number of translations in the physical page tables 362 for all partitions for a random set of pages. That is, the hypervisor 152 selects a random set of virtual and physical address translations in the physical page table 362 and sets the value of their valid field to indicate that the translation is invalid. The hypervisor 152 changes or varies the selection of the random set of pages for each tuning cycle, so that the tuning cycles have different random sets, and the random set is not selected in response to a page fault. Thus, the sampled page faults that the hypervisor 152 samples and uses in the below calculations (of blocks 825 and 830) includes the page faults that occur on the physical page table (because the partitions access the virtual address) on the pages whose virtual address to physical address translations were invalidated by the operation of block 810. The hypervisor 152 also increments the tuning cycle count, indicating that another tuning cycle has occurred.

Control then continues to block 815 where the hypervisor 152 determines whether a threshold number of tuning cycles since the previous time that the logical partitions 150 were processed (by the operation block 820, as further described below) has been reached. That is, the hypervisor 152 determines whether the tuning cycle count equals a threshold number of tuning cycles. In various embodiments, the threshold number of tuning cycles is set by the hypervisor 152, set by a system administrator by inputting data via the terminal 121, or set by programmatic control.

If the determination at block 815 is true, then a threshold number of tuning cycles has occurred, so control continues to block 817 where the hypervisor 152 resets the count of the number of tuning cycles to be zero. Control then continues to block 820 where the hypervisor 152 processes the logical partitions 150, as further described below with reference to FIG. 9. Thus, the hypervisor 152 processes the logical partitions 150 (as described in FIG. 9) every threshold number of tuning cycles, which is less frequently than every tuning cycle.

Control then continues to block 825 where the hypervisor 152 calculates the component weights 650 for the current tuning cycle, for each partition, for each of the load weight components 640. That is, the hypervisor 152 calculates the load weight components 640 for each partition for the current tuning cycle to be the recent activity multiplied by the number of partitions and divided by the sum of the recent activity for that load weight component 640 over all of the logical partitions 150. The recent activity for a load weight component 640 is the number of occurrences of that load weight component (the number of physical page table faults 640-1, the number of sampled page faults 640-2, the number of shared physical page pool faults 640-3, the number of re-page-ins 640-4, and the ratio of pages 640-5) that have occurred since the time of the previous tuning cycle.

Expressed as a formula, the component weight 650 is calculated for every logical partition LP and for every load weight component 640:

$$\text{componentWeight}_t = (\text{recentActivity}_{Lp} * n) / (\Sigma \text{ recentActivity}_{Lp});$$

where:
componentWeight$_t$ is the component weight 650 at the time t of the current tuning cycle;
recentActivity$_{Lp}$ is the number of occurrences of that load weight components 640 (the number of physical page table faults, the number of sampled page faults, the number of shared physical page pool faults, the number of re-page-ins, and the ratio of pages) that the logical partition has experienced since the time of the previous tuning cycle;
n is the number of logical partitions 150; and
$\Sigma$ recentActivity$_{Lp}$ is sum of the recent activity for the load weight component that has occurred over all of the n logical partitions 150.

Control then continues to block 830 where the hypervisor 152 calculates the component weights accumulated running average 655. That is, at each tuning cycle, the hypervisor 152 calculates the accumulated running average (ARA) for the component weights 650 for the load weight components 640. The hypervisor 152 accumulates the component weights 650, in a running average (the ARA) of values sampled over time. The ARA is computed by taking the current value of the component weight, adding the previously computed ARA for that component multiplied by an accumulation factor (AF), and dividing by one more than the accumulation factor. The accumulation factor is context-dependent, determining how much weight should be given to historical data, and is different depending on whether the current component weight (at the current tuning cycle) is larger, the same as, or smaller than the prior (at the previous tuning cycle) component weight accumulated running average.

Expressed as formulas:

if componentWeight$_t$>componentWeightARA$_{t-1}$, then
AF is increased by a value;

if componentWeight$_t$=componentWeightARA$_{t-1}$, then
AF is set to 0;

if componentWeight$_t$<componentWeightARA$_{t-1}$, then
AF is decreased by a value;

componentWeightARA$_t$=(componentWeight
ARA$_{t-1}$*AF)+componentWeight$_t$/(AF+1);

where:
componentWeight$_t$ is the component weight 650 at the time t of the current tuning cycle;
AF is the accumulation factor and is adjusted by a value that is set by the hypervisor 152, set by a system administrator by inputting data via the terminal 121, or set by programmatic control;
componentWeightARA$_t$ is the component weight accumulated running average 655 at the time t of the current tuning cycle; and
.componentWeightARA$_{t-1}$ is the component weight accumulated running average 655 at the time t-1 of the previous tuning cycle.

Control then returns to block 805 where the hypervisor 152 once again determines whether the current time equals the start of the next tuning cycle, as previously described above.

If the determination at block 815 is false, then the threshold number of tuning cycles since the previous time that the logical partitions 150 were processed (by operation of the block 820, as previously described above) has not been reached, so control continues to block 825 where the hypervisor 152 calculates the component weights, as previously described above, without processing the logical partitions 150 in block 820. Control then continues to block 830, as previously described above.

If the determination at block 805 is false, the current time does not equal the start of the next tuning cycle, so control continues to block 835 where the hypervisor 152 waits for a predetermined or variable period of time. Control then returns to block 805, as previously described above. Thus, the hypervisor 152 performs the processing of blocks 810, 815, 825, and 830 once per tuning cycle and performs the processing of blocks 817 and 820 once every threshold number of tuning cycles, which is less frequently than once per tuning cycle.

Figure 9:
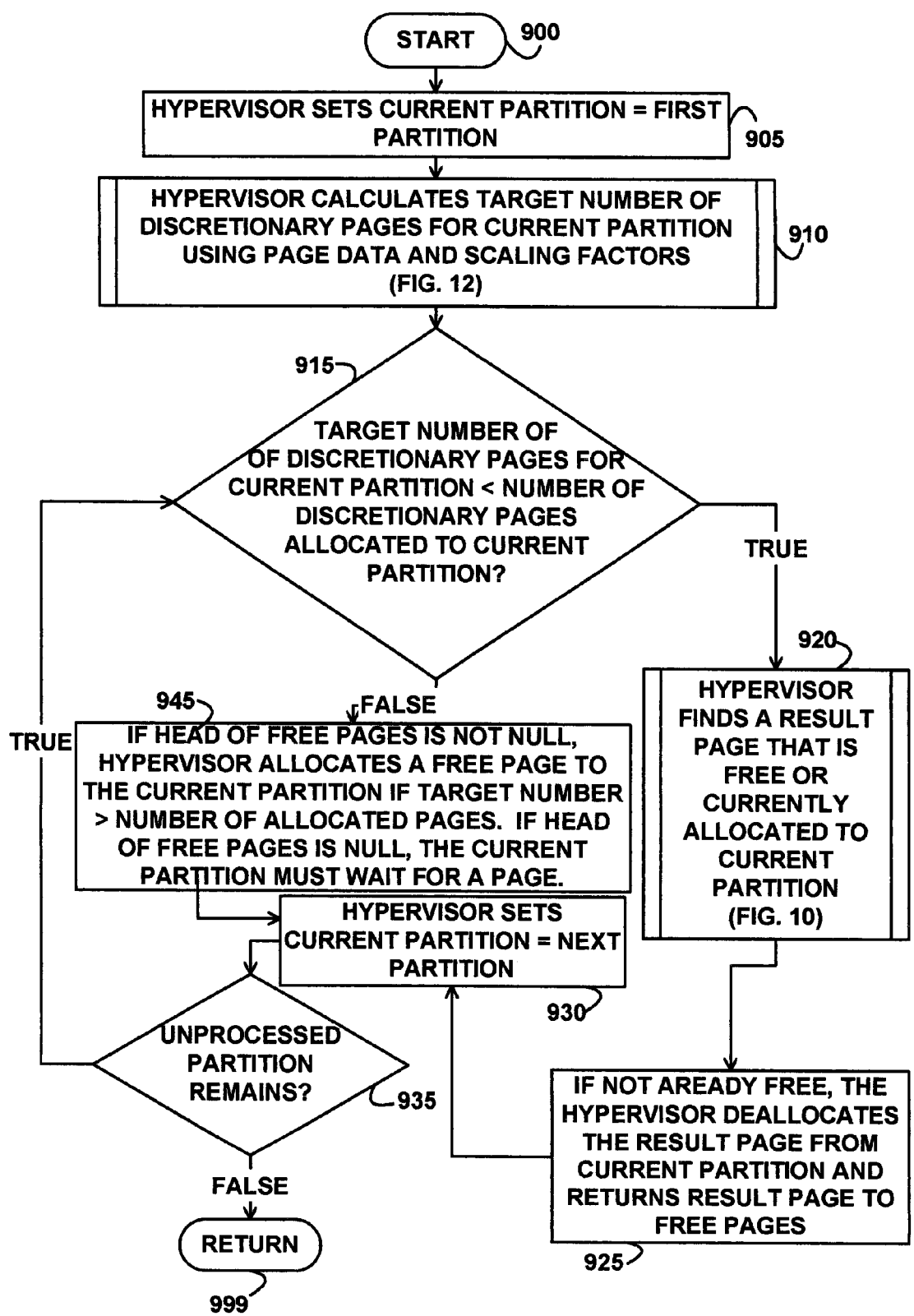
FIG. 9 depicts a flowchart of example processing for allocating and deallocating pages, according to an embodiment of the invention.

FIG. 9 depicts a flowchart of example processing for allocating and deallocating pages among partitions, according to an embodiment of the invention. Control begins at block 900. Control then continues to block 905 where the hypervisor 152 sets the current partition to be first partition. Control then continues to block 910 where the hypervisor 152 calculates the target number of discretionary physical pages for the current partition 685 as a function of the scaling factors 156 and the page data 158, as further described below with reference to FIG. 12.

Control then continues to block 915 where the hypervisor 152 determines whether the target number of discretionary physical pages 685 for the current partition (that was calculated at block 910, above) is less than the number of the discretionary pages that are currently allocated to the current partition (in the example of partition A, the number of the discretionary pages 420 in FIG. 4; or, in the example of partition B, the number of the discretionary pages 425 in FIG. 4).

If the determination at block 915 is true, then the target number of discretionary physical pages 685 for the current partition is less than the number of the discretionary pages that are currently allocated to the current partition, so control continues to block 920 where the hypervisor 152 finds a result page that is free or ages the discretionary pages, producing a result page that is currently allocated to the current partition, as further described below with reference to FIG. 10.

Control then continues to block 925 where the hypervisor 152 deallocates the result page from the current partition and returns the result page to the free pages 405 if the result page is not already free. The result page is now available for allocation to other of the logical partitions 150. Control then continues to block 930 where the hypervisor 152 sets the current partition to be the next partition. Control then continues to block 935 where the hypervisor 152 determines whether any partition exists that is unprocessed by the loop that starts at block 915.

If the determination at block 935 is true, then an unprocessed partition remains, so control returns to block 915, where the hypervisor 152 starts processing the next partition, as previously described above.

If the determination at block 935 is false, then all of the logical partitions 150 have been processed by the loop that starts at block 915, so control continues to block 999 where the logic of FIG. 9 returns to its invoker.

If the determination at block 915 is false, then the target number of discretionary pages 685 for the current partition is greater than or equal to the number of the discretionary pages that are allocated to the current partition, so control continues to block 945 where, if the target number of discretionary pages 685 for the current partition is greater than the number of the discretionary pages that are allocated to the current partition, then the hypervisor 152 allocates a free page to the current partition that requests a page if the head of the free pages is not null, i.e., if a free page exists. A partition that requests a page does so because the partition encountered a page fault on the cache page table 360, meaning that the page that the partition requested was not in the memory 102 and had its valid field in the cache page table 360 set to indicate that the virtual address to logical address translation is invalid. Since block 945 is executed, the hypervisor 152 does not perform the processing of block 920 for the current partition. If the head of the free pages is null, i.e., a free page does not exist, then the current partition that requests a page must wait for a free page to become available.

If the target number of discretionary pages 685 for the current partition is equal to the number of the discretionary pages that are allocated to the current partition, then the hypervisor 152 does not allocate a free page to the current partition because to do so would increase the number of discretionary pages allocated to current partition to above the target number.

Control then continues to block 930, as previously described above.

Figure 10:
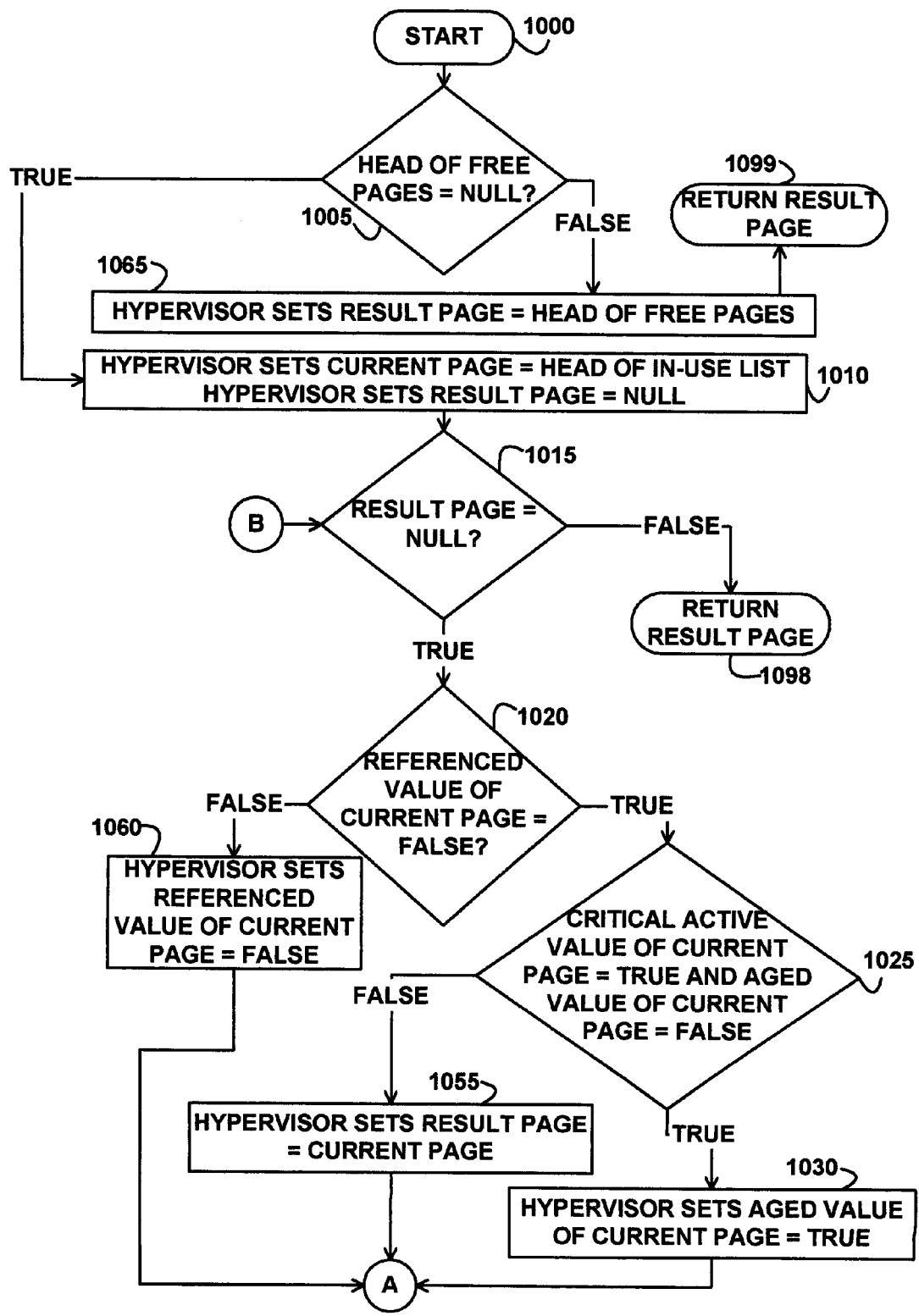
FIG. 10 depicts a flowchart of example processing for aging discretionary pages, according to an embodiment of the invention.
Figure 11:
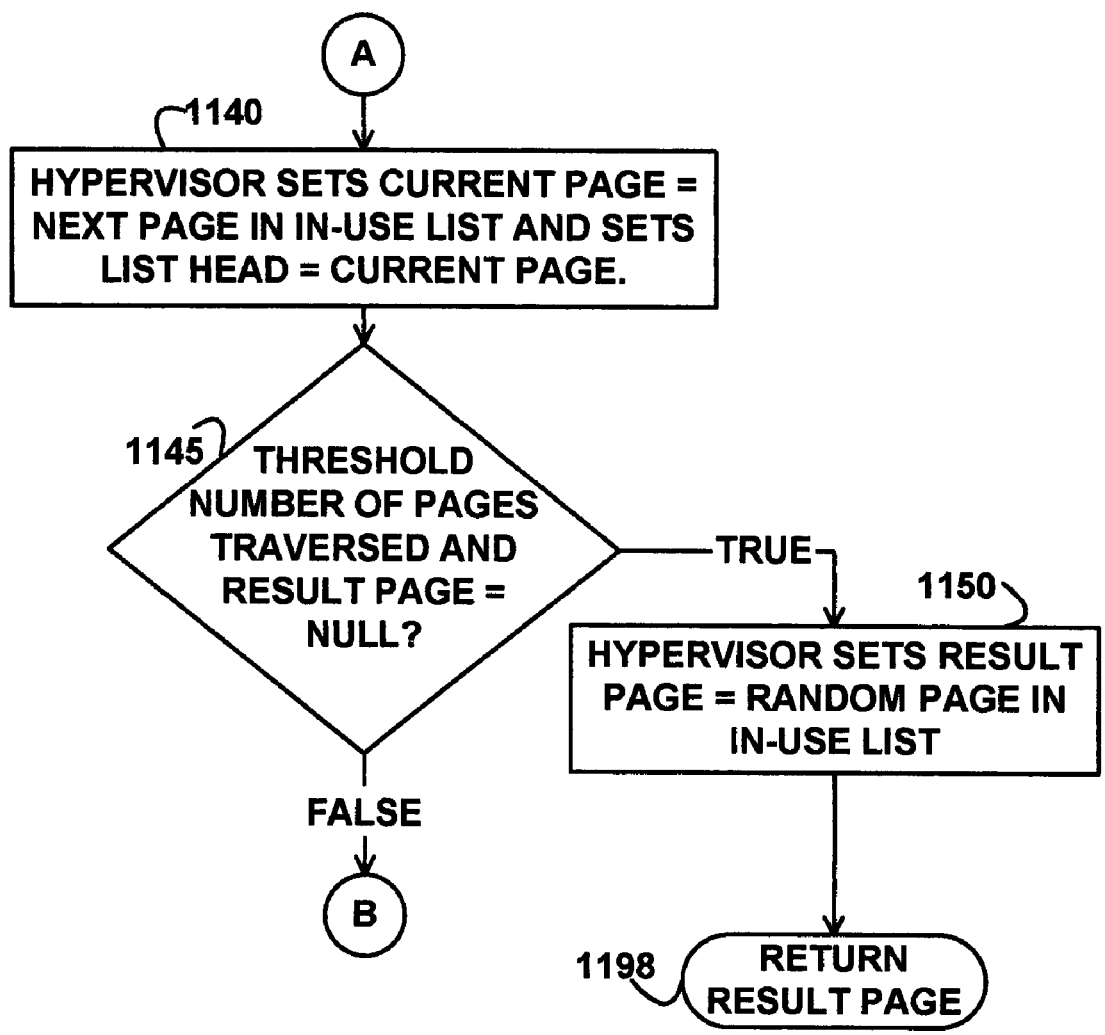
FIG. 11 depicts a flowchart of further example processing for aging discretionary pages, according to an embodiment of the invention.

FIGS. 10 and 11 depict flowcharts of example processing for aging discretionary pages, according to an embodiment of the invention. Page aging is the process of selecting discretionary pages that are in-use by the logical partitions 150 and making those pages free, i.e., available for allocation to other of the logical partitions 150.

Control begins at block 1000 of FIG. 10. Control then continues to block 1005 where the hypervisor 152 determines whether the head of the free pages 405 is null, i.e., whether the free pages 405 contains no pages. If the determination at block 1005 is true, then no pages are free, so control continues to block 1010 where the hypervisor 152 sets the current page to be the head of the in-use list 154 for the current partition and initializes the result page to be null, indicating that a result page has not yet been found.

Control then continues to block 1015 where the hypervisor 152 determines whether the result page is null. If the determination at block 1015 is true, then the result page is null and has not yet been found, so control continues to block 1020 where the hypervisor 152 determines whether the value in the referenced field 530 in the record in the in-use list 154 (associated with the current partition) for the current page is false.

If the determination at block 1020 is true, then the value in the referenced field 530 in the record in the in-use list 154 (associated with the current partition) for the current page is false, so control continues to block 1025 where the hypervisor 152 determines whether the value in the critical active field 525 in the in-use list 154 (associated with the current partition) for the current page is true and the value in the aged field 535 in the in-use list 154 (associated with the current partition) for the current page is false.

If the determination at block 1025 is true, then the value in the critical active field 525 in the in-use list 154 (associated with the current partition) for the current page is true and the value in the aged field 535 in the in-use list 154 (associated with the current partition) for the current page is false, so control continues to block 1030 where the hypervisor 152 sets the value in the aged field 535 in the in-use list 154 (associated with the current partition ) for the current page to be true. Control then continues to block 1140 (FIG. 11) where the hypervisor 152 sets the current page to be the next page in the in-use list 154 and sets the list head of the in-use list 154 associated with the current partition to be the current page. (Changing the list head of the circular, doubly-linked in-use list 154 also changes the tail of the in-use list 154.)

Control then continues to block 1145 where the hypervisor 152 determines whether a threshold number of pages in the in-use list 154 associated with the current partition have been traversed and examined by the loop that starts at block 1015 without finding a result page (the result page is still null).

If the determination at block 1145 is true, then the threshold number of pages have been traversed and a result page has not been found, so control continues to block 1150 where the hypervisor 152 sets the result page to be a random page in the in-use list 154 associated with the current partition. Thus, if no free page candidate is discovered after traversing the threshold number of pages by the loop that starts at block 1015, a page in the in-use list 154 is selected at random, which helps the page aging algorithm avoid expending too much processing time searching for a page to free, in cases where no page faults have occurred recently and large numbers of the discretionary pages 410 are marked with the in-use list with their referenced field 530 set to true.

Control then continues to block 1198 where the hypervisor 152 returns the result page, which is a random page from the in-use list 154 of the current partition.

If the determination at block 1145 is false, then a threshold number of pages have not been traversed or a result page has been found (the result page is not null), so control returns to block 1015, as previously described above.

If the determination at block 1025 is false, then the value in the critical active field 525 of the record in the in-use list 154 (associated with the current partition) that is associated with the current page is false or the value in the aged field 535 in the record in the in-use list 154 (associated with the current partition) that is associated with the current page is true, so control continues to block 1055 where the hypervisor 152 sets the result page to be the current page. Control then continues to block 1140, as previously explained above.

If the determination at block 1020 is false, then the value in the referenced field 530 of the record in the in-use list 154 (associated with the current partition) that is associated with the current page is true, so control continues to block 1060 where the hypervisor 152 sets the value in the referenced field 530 in the record in the in-use list 154 (associated with the current partition) that is associated with the current page to be false. Control then continues to block 1140, as previously described above If the determination at block 1015 is false, then the result page is not equal to null, so a result page has been found, so control continues to block 1098 where the hypervisor 152 returns the result page to the invoker of the logic of FIG. 10.

If the determination at block 1005 is false, then the head of the free pages 405 does not equal null and at least one free page exists, so control continues to block 1065 where the hypervisor 152 sets the result page to be the head of the free pages. Control then continues to block 1099 where the hypervisor 152 returns the result page, which is the head of the free pages, to the invoker of the logic of FIG. 10.

Figure 12:
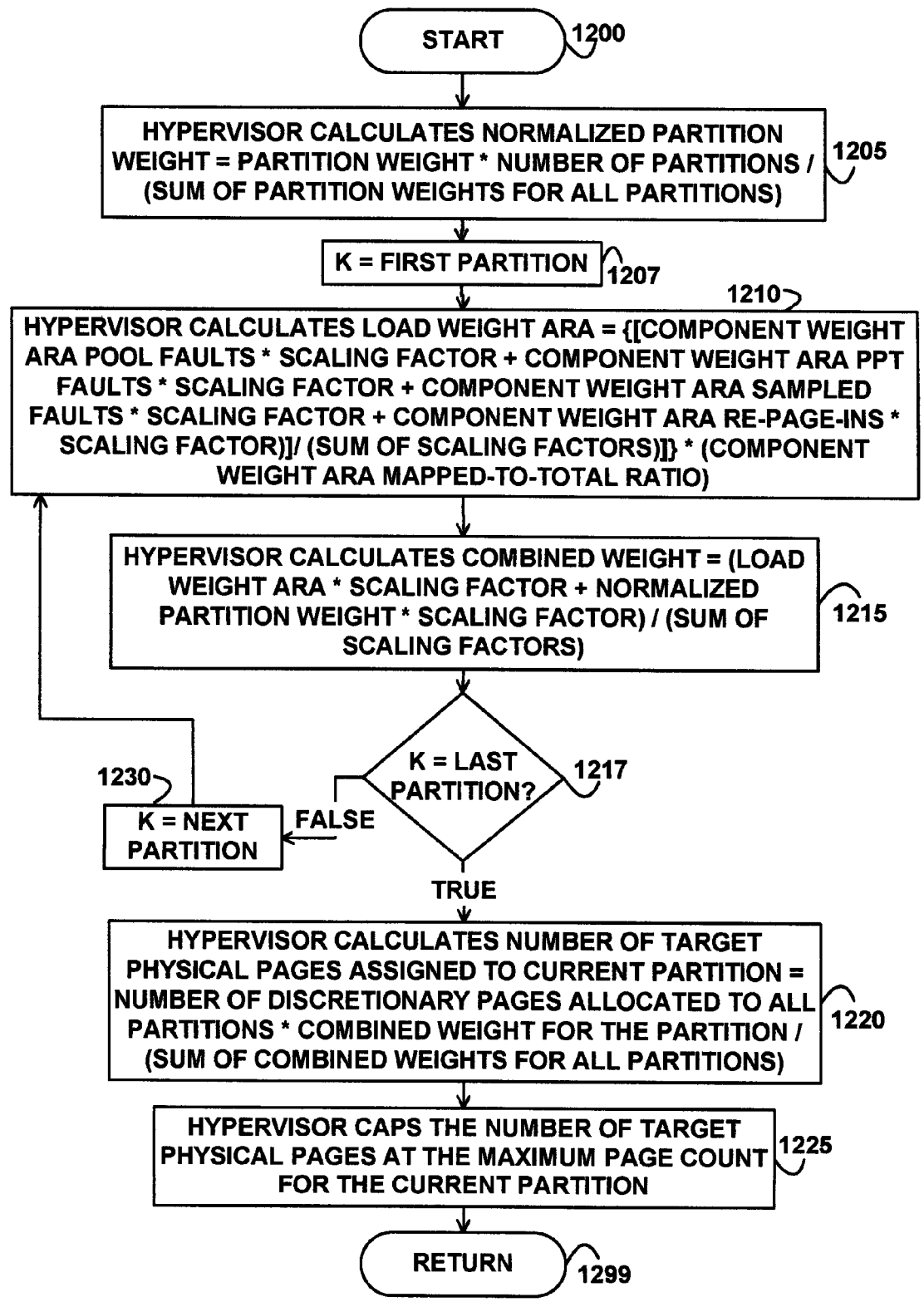
FIG. 12 depicts a flowchart of example processing for calculating a target number of discretionary pages for a partition, according to an embodiment of the invention.

FIG. 12 depicts a flowchart of example processing for calculating a target number of discretionary pages for allocation to the current partition, according to an embodiment of the invention.

Control begins at block 1200. Control then continues to block 1205 where the hypervisor 152 calculates the normalized partition weight 665 for the current partition to be the partition weight 660 for the current partition multiplied by the number of partitions (n), the product of which is divided by the sum of the partition weights 660 for all of the logical partitions 150. The following formula illustrates the processing of block 1205:

$$\text{normalizedpartitionWeight}_{Lp} = (\text{partitionWeight}_{Lp} * n)/(\Sigma \text{ partitionWeight}_j);$$

where:

normalizedpartitionWeight$_{Lp}$ is the normalized partition weight 665 for the current logical partition LP;

partitionWeight$_{Lp}$ is the partition weight 660 for the current logical partition LP;

n is the number of the logical partitions 150; and $\Sigma$ partitionWeight$_j$ is the sum of all partition weights 660 over all of the logical partitions 150, where j varies from 1 to n.

Control then continues to block 1207 where the hypervisor 152 initializes a variable K to represent the first partition.

Control then continues to block 1210 where the hypervisor 152 calculates the load weight accumulated running average 670 for the partition$_k$ by multiplying the component weight accumulated running averages 655 for the load weight components 640 by their respective scaling factors 156 and dividing the result by (the sum of the scaling factors 156) and multiplying that result by the component weight accumulated running average for the ratio of pages 640-5. The following formula illustrates the processing of block 1210:

$$\text{loadweightARA}_K = \{ \\ [(\text{componentweightARApoolfaults}_K * \text{poolfaultsScalingfactor}) + \\ (\text{componentweightARAPPTfaults}_K * \text{PPTfaultsScalingfactor}) + \\ (\text{componentweightSampledfaults}_K * \text{sampledfaultsScalingfactor}) + \\ (\text{componentweightre-page-ins}_K * \text{re-page-insScalingfactor})] / (\text{poolfaultsScalingfactor} + \text{PPTfaultsScalingfactor} + \text{sampledfaultsScalingfactor} + \text{re-page-insScalingfactor}) \} * \\ \text{componentWeightARAratio}_K; \text{ where}$$

loadweightARA$_K$ is the load weight accumulated running average 670 for the partition$_K$;

componentweightARAPPTfaults$_K$ is the component weights accumulated running average 655 for the load weight component of the physical page table faults 640-1 for the partition$_K$;

componentweightSampledfaults$_K$ is the component weights accumulated running average 655 for the load weight component of the number of sampled page faults 640-2 for the partition$_K$;

componentweightARApoolfaults$_K$ is the component weights accumulated running average 655 for the load weight component of the number of shared physical page pool faults 640-3 for the partition$_K$;

componentweightre-page-ins$_K$ is the component weights accumulated running average 655 for the load weight component of the number of re-page-ins 640-4 for the partition$_K$;

componentWeightARAratio$_K$ is the component weights accumulated running average 655 for the load weight component of the ratio of pages 640-5 for the partition$_K$;

PPTfaultsScalingfactor is the physical page table fault scaling factor 156-1;

sampledfaultsScalingfactor is the sampled fault scaling factor 156-2;

poolfaultsScalingfactor is the shared physical page pool fault scaling factor 156-3; and re-page-insScalingfactor is the number of re-page-ins scaling factor 156-5.

Control then continues to block 1215 where the hypervisor 152 calculates the combined weight 675 for the partition$_K$ to be (the load weight accumulated running average 670 multiplied by the load weight accumulated running average scaling factor 156-6) plus (the normalized partition weight 665 for the partition$_K$ multiplied by the partition weight scaling factor 156-4) divided by the sum of the scaling factors. The following formula illustrates the processing of block 1215:

$$\begin{aligned}\text{combinedWeight}_K =\ &((\text{loadweightARA}_K * \text{loadweightARAscalingfactor}) + (\text{normalized} \\ &\text{partitionWeight}_K * \text{partitionWeightscalingfactor})) / \\ &(\text{loadweightARAscalingfactor} + \text{partitionWeightscalingfactor});\end{aligned}$$

where:

combinedWeight$_K$ is the combined weight 675 for the partition$_K$;

loadweightARA$_K$ is the load weight accumulated running average 670 for the partition$_K$;

normalizedpartitionWeight$_K$ is the normalized partition weight 665 for the partition$_K$ partitionWeightscalingfactor is the partition weight scaling factor 156-4; and loadweightARAscalingfactor is the load weight accumulated running average scaling factor 156-6.

Control then continues to block 1217 where the hypervisor 152 determines whether K identifies the last partition. If the determination at block 1217 is true, then K identifies the last partition and all of the logical partitions 150 have been processed by the loop that starts at block 1210, so control continues to block 1220 where the hypervisor 152 calculates the target number 685 of discretionary physical pages to be allocated to the current partition to be the number of discretionary pages 680 allocated to all partitions multiplied by the combined weight 675 for the current partition divided by (the sum of the combined weights 675 for all of the logical partitions 150).

Control then continues to block 1225 where the hypervisor 152 caps the target number of discretionary physical pages 685 to be allocated to the current partition at the maximum page count 690 for the current partition. That is, the hypervisor 152 sets the target number of discretionary physical pages 685 to be the minimum of the maximum page count and the number of target physical pages that was calculated at block 1220.

Control then continues to block 1299 where the logic of FIG. 12 returns the target number of physical pages 685 for the current partition to the invoker.

If the determination at block 1217 is false, then not all of the logical partitions 150 have been processed by the loop that starts at block 1210, so control continues to block 1230 where the hypervisor 152 sets K to identify the next partition. Control then returns to block 1210, where the hypervisor 152 performs calculations for the next partition, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
    calculating a target number of discretionary pages for a first partition in a plurality of partitions as a function of load weight components for the plurality of partitions, wherein the load weight components comprise a number of physical page table faults, a number of sampled page faults, a number of shared physical page pool faults, a number of re-page-ins, and a ratio of a number of logical addresses that map to physical pages to a number of allocated physical pages;
    if the target number of discretionary pages for the first partition is less than a number of the discretionary pages that are allocated to the first partition, finding a result page that is allocated to the first partition and deallocating the result page from the first partition;
    if the target number of discretionary pages for the first partition greater than the number of the discretionary pages that are allocated to the first partition, allocating a free page to the first partition; and
    if the target number of discretionary pages for the first partition is equal to the number of the discretionary pages that are allocated to the first partition, refraining from allocating a free page to the first partition.

2. The method of claim 1, wherein the calculating the target number further comprises:
    calculating component weights of each of the load weight components for each of the plurality of partitions during a plurality of tuning cycles; and
    calculating an accumulated running average of each of the component weights over the plurality of tuning cycles.

3. The method of claim 2, wherein the calculating the accumulated running average of each of the component weights over the plurality of tuning cycles further comprises:
    for each of the plurality of partitions and for each of the component weights, adjusting a respective accumulation factor based on a relationship of the component weight at a current tuning cycle to the accumulated running average for the component weight at a previous tuning cycle; and
    for each of the plurality of partitions and for each of the component weights, calculating the accumulated running average for the component weight at the current tuning cycle based on the accumulated running average for the component weight at the previous tuning cycle and the respective accumulation factor.

4. The method of claim 3, wherein the calculating the target number further comprises:
    invalidating a number of translations of virtual addresses to physical addresses in a physical page table for a random set of pages during the current tuning cycle; and
    calculating the component weight at the current tuning cycle for the number of sampled page faults based on a number of page faults on the physical page table that occurred during the current tuning cycle for accesses by the first partition of the virtual addresses that were invalidated by the invalidating.

5. The method of claim 4, wherein the calculating the target number further comprises:
    for each of the plurality of partitions, calculating a respective load weight accumulated running average based on the accumulated running average of each of the component weights over the plurality of tuning cycles and a first plurality of scaling factors.

6. The method of claim 5, wherein the calculating the target number further comprises:
for each of the plurality of partitions, calculating a combined weight based on the respective load weight accumulated running average, and a second plurality of scaling factors.

7. The method of claim 6, wherein the calculating the target number further comprises:
calculating the target number of the discretionary pages for the first partition by multiplying a number of the discretionary pages allocated to all of the plurality of partitions by the combined weight for the first partition and dividing by a sum of the combined weights for all of the plurality of partitions.

8. The method of claim 7, wherein the calculating the target number further comprises:
capping the target number of the discretionary pages for the first partition at a maximum page count for the first partition.

9. A storage medium encoded with instruction that when executed comprise:
calculating a target number of discretionary pages for a first partition in a plurality of partitions as a function of load weight components for the plurality of partitions, wherein the load weight components comprise a number of physical page table faults, a number of sampled page faults, a number of shared physical page pool faults, a number of re-page-ins, and a ratio of a number of logical addresses that map to physical pages to a number of allocated physical pages;
if the target number of discretionary pages for the first partition is less than a number of the discretionary pages that are allocated to the first partition, finding a result page that is allocated to the first partition and deallocating the result page from the first partition;
if the target number of discretionary pages for the first partition is greater than the number of the discretionary pages that are allocated to the first partition, allocating a free page to the first partition; and
if the target number of discretionary pages for the first partition is equal to the number of the discretionary pages that are allocated to the first partition, refraining from allocating a free page to the first partition.

10. The storage medium of claim 9, wherein the calculating the target number further comprises:
calculating component weights of each of the load weight components for each of the plurality of partitions during a plurality of tuning cycles; and
calculating an accumulated running average of each of the component weights over the plurality of tuning cycles.

11. The storage medium of claim 10, wherein the calculating the accumulated running average of each of the component weights over the plurality of tuning cycles further comprises:
for each of the plurality of partitions and for each of the component weights, adjusting a respective accumulation factor based on a relationship of the component weight at a current tuning cycle to the accumulated running average for the component weight at a previous tuning cycle; and
for each of the plurality of partitions and for each of the component weights, calculating the accumulated running average for the component weight at the current tuning cycle based on the accumulated running average for the component weight at the previous tuning cycle and the respective accumulation factor.

12. The storage medium of claim 11, wherein the calculating the target number further comprises:
invalidating a number of translations of virtual addresses to physical addresses in a physical page table for a random set of pages during the current tuning cycle; and
calculating the component weight at the current tuning cycle for the number of sampled page faults based on a number of page faults on the physical page table that occurred during the current tuning cycle for accesses by the first partition of the virtual addresses that were invalidated by the invalidating.

13. The storage medium of claim 12, wherein the calculating the target number further comprises:
for each of the plurality of partitions, calculating a respective load weight accumulated running average based on the accumulated running average of each of the component weights over the plurality of tuning cycles and a first plurality of scaling factors.

14. The storage medium of claim 13, wherein the calculating the target number further comprises:
for each of the plurality of partitions, calculating a combined weight based on the respective load weight accumulated running average, and a second plurality of scaling factors.

15. The storage medium of claim 14, wherein the calculating the target number further comprises:
calculating the target number of the discretionary pages for the first partition by multiplying a number of the discretionary pages allocated to all of the plurality of partitions by the combined weight for the first partition and dividing by a sum of the combined weights for all of the plurality of partitions.

16. A computer system comprising:
a processor; and
a memory communicatively coupled to the processor, wherein the memory comprises instructions and wherein the instructions when executed on the processor comprise:
calculating a target number of discretionary pages for a first partition in a plurality of partitions as a function of load weight components for the plurality of partitions, wherein the load weight components comprise a number of physical page table faults, a number of sampled page faults, a number of shared physical page pool faults, a number of re-page-ins, and a ratio of a number of logical addresses that map to physical pages to a number of allocated physical pages, wherein the calculating further comprises calculating component weights of each of the load weight components for each of the plurality of partitions during a plurality of tuning cycles, and calculating an accumulated running average of each of the component weights over the plurality of tuning cycles,
if the target number of discretionary pages for the first partition is less than a number of the discretionary pages that are allocated to the first partition, finding a result page that is allocated to the first partition and deallocating the result page from the first partition,
if the target number of discretionary pages for the first partition is greater than the number of the discretionary pages that are allocated to the first partition, allocating a free page to the first partition, and
if the target number of discretionary pages for the first partition is equal to the number of the discretionary pages that are allocated to the first partition, refraining from allocating a free page to the first partition.

17. The computer system of claim 16, wherein the calculating the accumulated running average of each of the component weights over the plurality of tuning cycles further comprises:

for each of the plurality of partitions and for each of the component weights, adjusting a respective accumulation factor based on a relationship of the component weight at a current tuning cycle to the accumulated running average for the component weight at a previous tuning cycle; and for each of the plurality of partitions and for each of the component weights, calculating the accumulated running average for the component weight at the current tuning cycle based on the accumulated running average for the component weight at the previous tuning cycle and the respective accumulation factor.

18. The computer system of claim 17, wherein the calculating the target number further comprises:

invalidating a number of translations of virtual addresses to physical addresses in a physical page table for a random set of pages during the current tuning cycle; and calculating the component weight at the current tuning cycle for the number of sampled page faults based on a number of page faults on the physical page table that occurred during the current tuning cycle for accesses by the first partition of the virtual addresses that were invalidated by the invalidating.

19. The computer system of claim 18, wherein the calculating the target number further comprises:

for each of the plurality of partitions, calculating a respective load weight accumulated running average based on the accumulated running average of each of the component weights over the plurality of tuning cycles and a first plurality of scaling factors.

20. The computer system of claim 19, wherein the calculating the target number further comprises:

for each of the plurality of partitions, calculating a combined weight based on the respective load weight accumulated running average, and a second plurality of scaling factors; and calculating the target number of the discretionary pages for the first partition by multiplying a number of the discretionary pages allocated to all of the plurality of partitions by the combined weight for the first partition and dividing by a sum of the combined weights for all of the plurality of partitions.

* * * * *